United States Patent
Zhu et al.

(10) Patent No.: US 10,329,369 B2
(45) Date of Patent: Jun. 25, 2019

(54) PROCESS FOR MAKING BRANCHED REACTIVE BLOCK POLYMERS

(71) Applicant: Henkel IP & Holding GmbH, Duesseldorf (DE)

(72) Inventors: Qinyan Zhu, Cheshire, CT (US); John G. Woods, Farmington, CT (US)

(73) Assignee: Henkel IP & Holding GmbH, Duesseldorf (DE)

(*) Notice: Subject to any disclaimer, the term of this patent is extended or adjusted under 35 U.S.C. 154(b) by 152 days.

(21) Appl. No.: 15/610,748

(22) Filed: Jun. 1, 2017

(65) Prior Publication Data

US 2017/0267801 A1    Sep. 21, 2017

Related U.S. Application Data

(63) Continuation of application No. PCT/US2015/055849, filed on Oct. 16, 2015.

(60) Provisional application No. 62/088,976, filed on Dec. 8, 2014.

(51) Int. Cl.
| | |
|---|---|
| *C08F 265/04* | (2006.01) |
| *C08L 53/00* | (2006.01) |
| *C08F 20/14* | (2006.01) |
| *C08F 20/18* | (2006.01) |
| *C08F 2/38* | (2006.01) |

(52) U.S. Cl.
CPC ............ *C08F 265/04* (2013.01); *C08F 2/38* (2013.01); *C08F 20/14* (2013.01); *C08F 20/18* (2013.01); *C08L 53/00* (2013.01)

(58) Field of Classification Search
CPC ............ C08F 2/38; C08F 20/18; C08F 20/14; C08L 33/08; C08L 53/00; C08L 33/10; C08L 53/005; C08L 2205/025
See application file for complete search history.

(56) References Cited

U.S. PATENT DOCUMENTS

| | | |
|---|---|---|
| 6,319,987 B1 | 11/2001 | White et al. |
| 7,244,796 B2 | 7/2007 | Chisholm et al. |
| 7,498,395 B2 | 3/2009 | Chisholm et al. |
| 7,705,092 B2 | 4/2010 | Asai et al. |
| 9,006,362 B2 | 4/2015 | Woods et al. |
| 9,725,528 B2 * | 8/2017 | Jacobine ............... C08F 4/00 |
| 2007/0244018 A1 | 10/2007 | Visger et al. |
| 2014/0107283 A1 | 4/2014 | Zhu et al. |
| 2014/0221573 A1 | 8/2014 | Schall et al. |

OTHER PUBLICATIONS

International Search Report issued in connection with International Patent Application No. PCT/US2015/055849 dated Feb. 11, 2016.
Krzysztof Matyjaszewski et al., Macromolecules, Carnegie Mellon University, 44, 3270-3275 (2008).
Armes et al., Macromolecules, The University of Sheffield, U.K., 40, 7119-7125 (2007).
Zhu et al., Polymer 49, McMaster University, Canada, 3382-3392 (2008).
Perrier, Macromolecules, University of Leeds, U.K., 38, 2131-2136, (2005).

\* cited by examiner

*Primary Examiner* — Sanza L. McClendon (74) *Attorney, Agent, or Firm* — Steven C. Bauman (57) ABSTRACT

The present invention relates to controlled radical polymerization processes for making branched-functionalized block polyacrylate polymers and compositions formed therefrom. In particular, such reaction products are formed by ensuring that the reaction products are substantially flowable and non-gelling, indicating that substantially no polymerization has occurred. The branched-functionalized block polyacrylates may be further functionalized and/or polymerized.

32 Claims, 2 Drawing Sheets

PROCESS FOR MAKING BRANCHED REACTIVE BLOCK POLYMERS

FIELD OF THE INVENTION

The present invention relates to controlled radical polymerization processes for making branched reactive block polymers, reaction products of such processes, and compositions containing such reaction products. More particularly, the invention relates to a process of controlled radical polymerization of (meth)acrylic monomers employing a defined order of introduction of the reactants, and/or a specific set of reaction conditions which yield a polymerizable (meth)acrylate functionalized branched block copolymers, useful for adhesive, sealant and coating compositions.

BACKGROUND OF THE INVENTION

There is a constant demand for economic and efficient ways to produce polymers. Controlled radical polymerization (hereinafter CRP), including single-electron transfer living radical polymerization (hereinafter SET-LRP) and atom transfer living polymerization (hereinafter ATRP), is a process which can produce various polymer products, in high yield, with functional, non-terminated ends, with high molecular weights, and with a low polydispersity index. Thus, there exists a need, however, for a CRP polymer process that is a convenient and economic route for producing functionalized branched block polymeric materials.

SUMMARY OF THE INVENTION

The present invention provides for the formation of polymerizable (meth)acrylate-functionalized branched block copolymers by the sequential addition and copolymerization of mono and di-functional monomers and termination of the subsequent reaction prior to the formation of macroscopic gels. The reaction is controllably quenched prior to the formation of crosslinked material, and thus is substantially free of cross-linked material and thus flowable. The Branching is designed into the molecule at relatively precise locations on the block copolymer by being formed in this manner, new polymeric materials with multiple and orthogonal functionalities, suitable for subsequent curing or for post-polymer modification are obtained. These materials may be used as reactive components of adhesive, sealant and coating compositions.

In one aspect of the invention there is provided a polymer composition which includes:

(i) a linear or star-shaped block polyacrylate copolymer which includes the structure:

$$\text{Ri-}[\{A_a\}\text{-}\{B_bC_c\}\text{—X}]_z \qquad \text{(Structure III)},$$

wherein A is a polyacrylate block derived from a monofunctional (meth)acrylate monomer or monofunctional (meth)acrylamide monomer, AB is a random functionalized polyacrylate block, wherein portion B of the BC block contains a polymerizable group derived from a difunctional (meth)acrylate monomer or a difunctional (meth)acrylamide monomer and portion C of the BC block is derived from a monofunctional (meth)acrylate monomer or monofunctional (meth)acrylamide monomer; and (ii) a linear or star-shaped block polyacrylate copolymer comprising the structure:

$$\text{Ri-}[\{A_a\}\text{-}\{B_{b-d}C_cD_d\}\text{-X}]_z \qquad \text{(Structure IV)},$$

wherein A is a polyacrylate block derived from a monofunctional (meth)acrylate monomer or monofunctional (meth)acrylamide monomer, and BCD is a random functionalized polyacrylate block, wherein portion B of the BCD block contains a polymerizable group derived from a difunctional (meth)acrylate monomer or a difunctional (meth)acrylamide monomer, portion C of the BCD block is derived from a difunctional (meth)acrylate monomer or a difunctional (meth)acrylamide monomer, and portion D of the BCD block includes a polymer branched-structure;

and wherein, in each of Structures III and IV the following definitions apply:

Ri is an initiator fragment derived from halogenated compounds which initiate metal-catalyzed controlled radical polymerization;

X is a halogen;

z is an integer from 1-6;

a is 10 to 10,000;

b is an integer in the range from a/100 to a/10;

c is an integer in the range from a/200 to a/2; and d is an integer greater than 0 and less than b.

In another aspect of the invention, Structures III and IV above have the following structures respectively:

Structure III

-continued

Structure IV wherein Ri is an initiator fragment derived from halogenated compounds which initiate metal-catalyzed controlled radical polymerization;

R is —CH$_3$ or H;

a is 10 to 10,000;

R$^1$ is a hydrocarbyl group C$_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;

G is a divalent hydrocarbyl group C$_{1-20}$ which may contain one or more heteroatoms and is selected from the group consisting of alkylenes, alkylene oxides, alkylene esters and combinations thereof and;

X is a halogen;

Q is oxygen or NR$^2$, where R$^2$ is H or C$_{1-4}$ alkyl;

z is and integer from 1-6;

a is 10 to 10,000;

b is an integer in the range from a/100 to a/10;

c is an integer in the range from a/200 to a/2; and d is an integer greater than 0 and less than b.

In yet another aspect of the invention there is provided:

A controlled radical polymerization method for making polymerizable branched-functionalized polyacrylates which includes;

a) in a reaction vessel, reacting an initiator have the formula with a monofunctional monomer having the structure to form a macro-initiator having a structure:

Structure I b) Sequentially reacting in the same reaction vessel the macro-initiator Structure I with a difunctional monomer having the structure:

Structure II wherein in each of the structures in a) and b) have the following definitions;

Ri is an initiator fragment derived from halogenated compounds which initiate metal-catalyzed controlled radical polymerization;

R is —CH$_3$ or H;

n is 10-10,000;

R$^1$ is a hydrocarbyl group C$_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;

G is a divalent hydrocarbyl group $C_{1-20}$ which may contain one or more heteroatoms and is selected from the group consisting of alkylenes, alkylene oxides, alkylene esters and combinations thereof and; X is a halogen;

Q is Oxygen or $NR^2$, where $R^2$ is H or $C_{1-4}$ alkyl;

z is and integer from 1-6; and wherein the sequentially reacting is conducted for a time and at a temperature to prevent complete conversion of the difunctional (meth)acrylate monomer. The sequential addition of the difunctional monomer and prevention of its complete conversion, such as by quenching the reaction, provides for the formation of the novel branched block copolymers of the present invention.

In still another aspect of the invention, there is provided a controlled radical polymerization process for making flowable, branch-functionalized polyacrylates which includes:

(i) forming a reaction mixture by feeding a mixture of one or more monofunctional (meth)acrylate monomers and at least one amine ligand into a reaction vessel containing a solvent, and adding at least one halogenated initiator and a metal catalyst;

(ii) sequentially feeding at least one difunctional (meth) acrylate monomer into the reaction mixture and allowing a reaction to proceed to obtain a desired degree of branch functionalized polyacrylate polymer to form, whereby the branch-functionalized polyacrylate is substantially free of macroscopically gelled product and/or is flowable.

The ability to flow (be flowable) indicates that the resultant polymerizable (meth)acrylate branched block copolymer product is substantially free of macroscopically gelled domains (i.e., bulk gelled product), although minor amounts of microscopic gelled domains may be formed. The ability to flow and be substantaillty free of macroscopically gelled domains indicates that the resultant polymerizable (meth) acrylate branched block copolymer product is substantially free of crosslinking. By the term "substantially free" is meant that at least about 90% is free of crosslinking (about 10% or less is crosslinked), desirably at least about 95% is free of crosslinking (about 5% or less is crosslinked), more desirably at least about 97% is free of crosslinking (about 3% or less is crosslinked) and even more desirably about 99% is free of crosslinking (about 1% or less is crosslinked). Of course, the most desired result would be that 100% (within the limits of scientific measurement errors) of the resultant polymerizable (meth)acrylate branched block copolymer product is free of crosslinking.

DETAILED DESCRIPTION OF THE INVENTION

There exists a need for a method of controlled radical polymerization that provides for polymerizable (meth)acrylate-functionalized branched block copolymers.

Atom Transfer Radical Polymerization (hereinafter ATRP) provides a method to build polymers. Typically, ATRP can be performed on a narrow range of monomers with a narrow range of initiators. Also, ATRP is typically catalyzed with a metal in the +1 (or $M^{+1}$), or other lower oxidation state, such as a Cu(I) salt catalyst. As the polymerization process is slow, high concentrations of the catalyst are needed to drive the reaction as are high temperatures which must be maintained for a prolonged period of time. Though functional ends are desirable for the final product polymer, a ATRP catalyst can be unstable and promote termination concomitant with formation of non-functionalized end groups.

In contrast to ATRP, SET-LRP uses a combination of zero-valent copper metal, Cu(0) and a polar solvent as a catalyst system, rather than Cu(1) salts. This method has several benefits including the incorporation of substantially lower amounts of solubilized copper; faster polymerization rates; lower polymerization temperatures and higher retention of activated halide chain ends at high conversions. As a result of these benefits, polymers prepared by SET-LRP are, in general, easier to purify, lower in cost, more suitable for (a) polymerization of volatile monomers, (b) functionalization of chain-ends and (c) formation of block copolymers compared to corresponding polymers prepared by ATRP. Thus for purposes of the present invention, SET-LRP is preferred.

The processes of the present invention produces polymers that exhibit improved properties for use in pressure sensitive adhesives, hot-melt adhesives, structural adhesives and sealants, surface coatings, and toughening agents for thermosetting compounds. Moreover, the process of the present invention allows for improved production of block copolymers for controlled morphology.

The inventive processes include a precise order of addition of the reactants and/or a particular set of reaction conditions to yield polymers with improved uniformity of structure and properties. The methods of the present invention allow for greater control over the final polymer products such that the desired branching is controlled in the final product. Also, because this process is well controlled, it can be implemented on a large scale with a high predictability and/or used to tailor the properties of the final polymer products to new degrees, and products can be designed based on their properties.

To achieve the desired result, in the process of the invention, it is critical that the difunctional monomer be added sequentially as set forth herein. In the process of the present invention, a reaction mixture is formed by feeding a mixture of one or more monofunctional (meth)acrylate monomers and at least one amine ligand into a reaction vessel containing a solvent, and adding at least one halogenated initiator and a metal catalyst thereto. This is followed by the sequential step of adding at least one difunctional (meth)acrylate monomer into the reaction mixture and allowing a reaction to proceed to obtain a desired degree of branch functionalized polyacrylate polymer to form. As previously indicated, the polymerizable branch-functionalized polyacrylate copolymer product is flowable and/or substantially free of macroscopically gelled product, indicating that substantially no crosslinking, as further described herein, occurs.

In the processes of the present invention, the temperature at which polymerization is carried out is well controlled and typically lower than other methods of polymerization. Preferably, the temperature of polymerization is between about 0° C. and 80° C. For example, between about 23° C., i.e., about room temperature and 70° C. or between about 40° C. and 60° C. In addition, in embodiments of the invention, the temperature during addition may differ from the temperature during continued polymerization, and the temperature may be changed during these periods.

As used herein, the terms "halo" and "halogen" are intended to be synonymous, and both are intended to include elements commonly classified as "halogens", such as chlorine, bromine, and iodine, but not fluorine. Also as used herein, the term (meth)acrylate(s) is intended to mean acrylates and methacrylates.

The present invention provides for more predictable location and amount of branching such that the polymer can be so tailored. For example, in the formation of the block copolymers as described herein the branching is located on a specific block as indicated by the structural formulas, thus creating an intended architecture to the copolymer molecules. The present invention also permits efficient and predictable end group functionality in the final polymerizable copolymer product.

The process of the present invention employs one or more (meth)acrylate monomers. As previously indicated, the term "(meth)acrylate monomer" includes both acrylate and methacrylate monomers. The (meth)acrylate monomer may be any desired (meth)acrylate monomer including, without limitation, such monomers as (meth)acrylic acid monomers such as (meth)acrylic acid, methyl(meth)acrylate, ethyl (meth)acrylate, n-propyl(meth)acrylate, isopropyl(meth) acrylate, n-butyl(meth)acrylate, isobutyl(meth)acrylate, tert-butyl(meth)acrylate, n-pentyl(meth)acrylate, n-hexyl(meth) acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, toluyl(meth)acrylate, benzyl(meth) acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl(meth) acrylate, 2-aminoethyl(meth)acrylate, -(methacryloyloxypropyl)trimethoxysilane, (meth)acrylic acid-ethylene oxide adducts, trifluoromethylmethyl(meth) acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl (meth)acrylate, 2-perfluoromethyl-2-perfluoroethylethyl (meth)acrylate, 2-perfluorohexylethyl(meth)acrylate, 2-perfluorodecylethyl(meth)acrylate and 2-perfluorohexadecylethyl(meth)acrylate. Particularly desirable is n-butyl acrylate, methyl methacrylate, 2-ethylhexyl acrylate, methyl acrylate, tert-butyl acrylate, 2-hydroxyethyl acrylate, glycidyl methacrylate or a combination thereof. However, any acrylate or methacrylate may be used in the present invention.

The process of the present invention employs one or more metal catalysts. As used herein the term "metal catalyst" means a metal-containing compound or complex that contributes to determining the position of the atom transfer equilibrium and dynamics of exchange between dormant and active species. Thus, the metal catalyst employed should preferably be a good electron donor. Suitable metal catalysts include, for example, Cu(0), $Cu_2S$, $Cu_2Te$, $Cu_2Se$, Mn, Ni, Pt, Fe, R, V, and combinations thereof. The processes of the invention may also include a deactivator such as $CuBr_2$ or $CuCl_2$.

The metal catalyst may be in one or more physical forms. For example, the metal catalyst may be a wire, mesh, screen, shavings, powder, tubing, pellet, crystals, or other solid form. The metal catalyst may be a copper wire, a copper mesh, a copper screen, a copper shaving, a copper powder, a copper gauze, a copper sinter, a copper filter, a copper sliver, a copper tubing, copper crystals, copper pellets, a coating of elemental copper on non-reactive materials, and combinations thereof. Preferably, the metal catalyst is a copper mesh treated with a hydrochloric acid aqueous solution.

The process of the present invention employs one or more amine ligand. As used herein, the term "amine ligand" means a nitrogen-containing ligand. Such amine ligands are thought to solubilize the metal catalyst so it is available in its higher oxidation state. Thus, the ligand may drive the polymerization reaction by promoting the mixing of the various components of the reaction mixture on a molecular level. The amine ligands may be any amine ligand, including without limitation, primary, secondary, and tertiary alkyl or aromatic amines, as well as polyamines which may be linear, branched, or dendritic polyamines and polyamides. Suitable amine ligands include, for example, may include tris(2-dimethylaminoethyl)amine (Me6-TREN), N,N,N,N,N-pentamethyldiethylenetriamine (PMDETA), tris(2-aminoethyl) amine (TREN), or a combination thereof.

The process of the present invention employs one or more halogenated initiator. As used herein, the term "halogenated initiator" includes halogen-containing compounds that initiate the free radical reaction and contribute to the number of growing polymer chains in the reaction vessel. As previously indicated, fluorine inititators are not believed to be useful in the present invention. For example, the initiator may include: diethyl meso-2,5-dibromoadipate; dimethyl 2,6-dibromoheptanedioate, ethylene glycol bis(2-bromopropionate); ethylene glycol mono-2-bromopropionate; trimethylolpropane tris(2-bromopropionate); pentaerythritol tetrakis (2-bromopropionate); 2,2-dichloacetophenone; methyl 2-bromopropionate; methyl 2-chloropropionate; N-chloro-2-pyrrolidinone; N-bromosuccinimide; polyethylene glycol bis(2-bromopropionate); polyethylene glycol mono(2-bromopropionate); 2-bromopropionitrile; dibromochloromethane; 2,2-dibromo-2-cyanoacetamide; α,α'-dibromo-ortho-xylene; α,α'-dibromo-meta-xylene; α,α'-dibromo-para-xylene; α,α'-dichloro-para-xylene; 2-bromopropionic acid; methyl trichloroacetate; para-tolunesulfonyl chloride; biphenyl-4,4'-disulfonyl chloride; diphenylether-4,4'-disulfonylchloride; bromoform; iodoform carbon tetrachloride; and combinations thereof. In some embodiments, the initiator may be an alkyl, sulfonyl, or nitrogen halide. The nitrogen halide can be also halogenated nylon, peptide, or protein. Alternatively, a polymer containing active halide groups, for example, poly(vinyl)chloride), the chloromethyl group or polychrolomethylsytrene) of the polymers and copolymers can also be used as initiators. Preferably, the halogenated initiator is dimethyl 2,6-dibromoheptanedioate, diethyl meso-2,5-dibromoadipate, ethylene glycol bis(2-bromopropionate); 2,2-dichloacetophenone, trimethylolpropane tris(2-bromopropionate); methyl 2-bromopropionate, or a combination thereof.

The process of the present invention employs one or more solvent. As used herein, the term "solvent" means a compound to reduce viscosity of the reaction mixture, increase conversion of the ligand, and/or promote fast disproportionation of the catalyst in order to facilitate ultrafast polymerization. Further, the solvent is intended to be non-reactive in order to prevent chain transfer, side reactions, or poisoning of the catalyst. Desirable solvents of the present methods include, protic, or dipolar aprotic solvents. Some desired solvents include acetonitrile, water, alcohol, or dipolar aprotic solvents, ethylene carbonate, propylene carbonate, ionic liquids, or a mixture thereof. For example, such solvents may include: ethylene glycol, diethylene glycol, triethylene glycol, 2-(2-ethoxyethoxy)ethanol, tetraethylene glycol, glycerine, hydroxyethyl(meth)acrylate (HEMA), phenols, dimethylsulfoxide (DMSO), dimethylforamide (DMF), dimethylacetamide (DMAc), N-methyl-2-pyrrolidone (NMP), ionic liquids, ethylene carbonate, and propylene carbonate. Suitable alcohols include methanol, ethanol, propanol, isopropanol, butanol, and tert butanol. Desirably, the solvent or solvent blend chosen does not cause precipitation of the polymer product during the reaction. Desirably, the solvent is acetonitrile, dimethylformate, ethylene carbonate, methanol, ethanol, propylene carbonate, water, dimethylformamide, propionitrile, ethylene glycol, an ionic liquid, or a combination thereof.

The products of the inventive process may be used to provide curable resin compositions useful as adhesives, sealants, or coatings. The polymers of the methods also exhibit good oil resistance, heat resistance, adhesiveness and flexibility. Further, the products encompassed by the methods of the present invention can be widely used as pressure sensitive adhesive formulations, hot-melt adhesives, structural adhesives, sealants, and coatings and the like.

The process of the present invention may employ and the compositions of the present invention may include additional components to provide one or more desired characteristics to the products of the processes or to the compositions. Suitable additional components include, for example, monomers (in addition to the acrylate monomers described above), polymers, plasticizers, thickening agents, rheology agents, coloring agents, pigments, fillers, additional initiators (other than those described above), and combinations thereof.

EXAMPLES

Characterization

Monomer conversions were determined by NMR and GC. NMR spectra were collected with the Varian Mercury Plus equipped with a 5 mm ATB probe and Performa I PFG. Varian Software version VNMRJ 3.2A. GC analysis were done with Hewlett Packard 5890 Series II, HP5871A Mass selective detector, and HP 7673B Auto sampler, along with Chem Station software G1701BA version B.01.00.

Polymers were measured by Gel Permeation Chromatography, Water 1525 Pump, 2414 RI Detector and 2487 UV Detector, 717 Auto Sampler, Empower 3 software. Linear and Narrow molecular weight PMMA standards were used for calibration to determine the weight average molecular weight (Mw), the number average molecular weight Mn) and the polydispersity (Mw/Mn)

Polymers were also characterized by the following GPC-MALLS (multiangle laser light scattering (LS)) for branching analysis:

| | |
|---|---|
| Column Set: 2 Polypore columns + guard | Detector(s): RI |
| Column Temperature: 40 C. | Flow Rate: 1 ml/min. |
| Injection: 100 ul | Run Time: 30 min. |
| Number of Injections.: 2/sample | Mobile-phase: THF stabilized |
| | Instrument: Shimadzu HPLC |
| Sample Concentrations: mg/4 ml | Process Method: |
| No sample was filtered. | |
| Sample Set Method: | Empower Project: |
| 1307015. | NewGPCShimadzu2008 |

LS Conditions:
LS and RI (Refractive Index) detectors are from Wyatt Technology.
The cell temperature was controlled at 25° C. in both detectors.

Example 1: Synthesis of Branched Polyacrylate by Copolymerization of nBuA (n-Butyl Acrylate) and HDDA (Hexanediol Diacrylate)

To a 3 L reaction flask fitted with mechanical stirrer, thermocouple, nitrogen sweep, condenser and septum-sealed addition port was added dimethyl 2,6-dibromoheptanedioate (2.77 g; 8.0 mmoles), ethanol (800 g; reagent grade) and copper mesh (2.23 g), which was treated by immersion in solution of HCl in acetone and rinsed with acetone before use. The mixture was purged with nitrogen for about 90 minutes, stirred and warmed to 45° C.

To 1 L Shlenk flask was added n-butyl acrylate (512 g; 4.0 moles), Me$_6$-TREN (0.22 g; 0.96 mmoles); and a solution of copper (II) bromide (0.018 g; 0.08 mmoles) in ethanol (160 g). The contents were mixed to give a clear solution and chilled by placing flask in bath containing powered dry-ice for about 1 hour. The flask was evacuated to 1.1 torr, and the vacuum released under nitrogen. The "chill-pump-nitrogen fill" cycle was repeated 4 times to ensure complete removal of oxygen.

The contents of the Shlenk flask were transferred under pressure of nitrogen, by means of cannula line, into the stirred mixture in the reaction flask over a period of about 1 hour. During this time polymerization of the monomer was initiated and the solution developed a light green coloration. The reaction was continued for an additional 3 hours, while the temperature was maintained at 44-47° C. A small sample of the mixture was removed using a nitrogen-filled gas-tight syringe and monomer conversion found to be 78% by $^1$H NMR analysis and Mn was 22,300 with PDI 1.54 by GPC-RI analysis.

A solution of 1,6-hexanediol diacrylate (27.0 g; 120 mmoles); Me$_6$-TREN (0.055 g; 0.24 mmoles) and ethanol (80 g) was de-oxygenated according to the procedure described above and transferred by cannula addition over 15 minutes to the stirred reaction flask. The reaction was continued for an additional 3 hours at 45° C. and quenched by air.

Figure 1A:
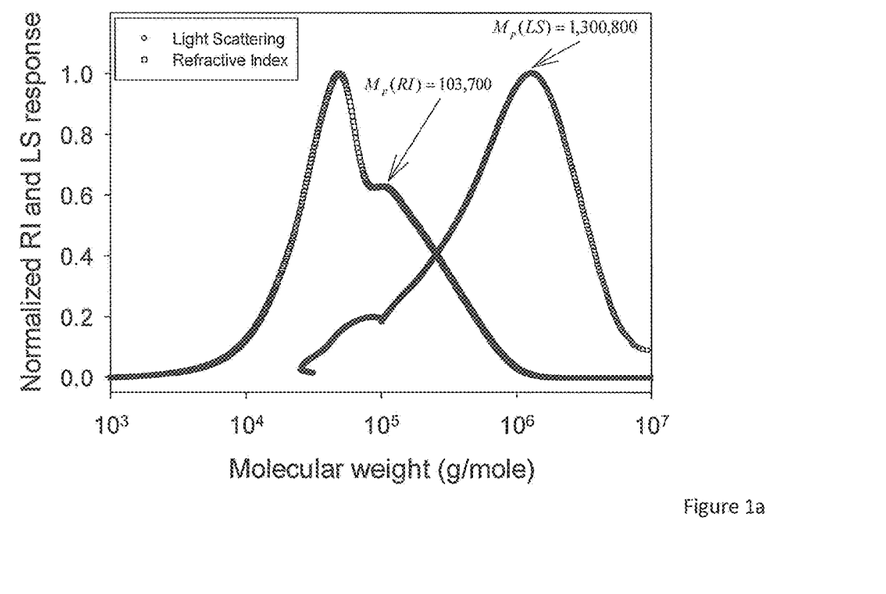
FIG. 1a shows GPC refractive index (RI) traces of poly (n-butyl acrylate) directly before addition of HDDA and after copolymerization with HDDA (Example 1). Molecular weights were determined relative to PMMA standards.
Figure 1B:
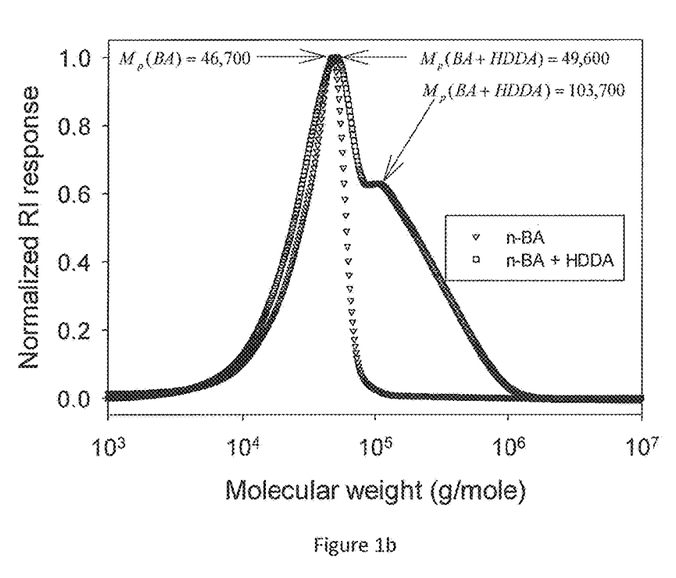
FIG. 1b shows a comparison of GPC traces with refractive index (RI) and light scattering (LS) detectors for polymer of Example 1. The absolute molecular weight (MW) of the high MW fraction is ~1,400,000 g/mole as determined by light scattering (LS) measurement. In contrast, the MW of this fraction, relative to linear PMMA standards by refractive index measurement, is ~104,000 g/mole. The difference confirms the high MW fraction has a branched, rather than a linear, structure.

At the end of polymerization, the conversion of nBuA was 90% and the conversion of HDDA was 91% by GC analysis. Regular GPC analysis, using a differential refractive index detector and calibration to linear PMMA standards, shows the poly (n-butyl acrylate) as a monomodal polymer with $M_{peak}$=46,700 g/mole (FIG. 1a). Following the addition and reaction of HDDA, a bimodal distribution of molecular weights is observed with high and low peak molecular weight values. The low MW peak is shifted to a slightly higher value ($M_{peak}$=49,600) indicating the presence of a linear polymer fraction derived from the copolymerization of residual n-BuA and one of the acrylate groups of the freshly added HDDA. This fraction of the polymer blend is consistent with that of a linear polymer having pendant acrylate functional groups. In contrast, the high molecular weight fraction ($M_{peak}$=103,700 g/mole) is consistent with the formation of a branched polymer resulting from the further polymerization of polymer-bound pendant acrylate groups. The branched molecular structure of the high molecular weight fraction was confirmed by conducting the GPC analysis using a light scattering detector. In this instance, the absolute molecular weight of the high molecular weight fraction is obtained (FIG. 2b). The peak value, ($M_{peak}$=1,300,800 g/mole), is significantly higher than the value determined using the RI detector, which is relative to the size of the linear PMMA standards and not absolute. Since it is already well established that branched polymers have a more compact structure (i.e. smaller size) compared to linear polymers of same composition and molecular weight, the difference in molecular weights observed with RI and LS detectors, can be attributed to the formation of branched polymer structures.

The polymer solution GPC results are listed in table 1.

Examples 2: Synthesis of Branched Polyacrylate by Copolymerization of n-BuA and 3-(acryloyloxy)-2-hydroxypropyl methacrylate The synthetic procedure of Example 1 was repeated using 3-(acryloyloxy)-2-hydroxypropyl methacrylate in place of HDDA as difunctional branching agent The mole ratio of 3-(acryloyloxy)-2-hydroxypropyl methacrylate to initiator was 10. The difunctional branching agent reaction time was 3 hrs. The polymer solution was also analyzed by GPC with MALLs detector and the results are listed in table 1.

Example 3: Synthesis of Branched Polyacrylate by Copolymerization of n-BuA and Bisphenol A Diacrylate (BPA)

The synthetic procedure of Example 1 was repeated using bisphenol A diacrylate in place of HDDA as difunctional branching agent. The mole ratio of BPA to initiator was 6. The difunctional branching agent reaction time was 3 hrs. The polymer solution was also analyzed by GPC with MALLs detector and the results are listed in table 1.

Example 4: Synthesis of Branched Polyacrylate by Copolymerization of n-BuA and Ethoxylated Bisphenol A Dimethacrylate (EBIPMA)

The synthetic procedure of Example 1 was repeated using ethoxylated bisphenol A dimethacrylate in place of HDDA as difunctional branching agent. The mole ratio of EBIPMA to initiator was 8. The difunctional branching agent reaction time was 1 hr. The polymer solution was also analyzed by GPC with MALLs detector and the results are listed in table 1.

Comparative Example 1: Synthesis of High Molecular Weight Dibromo-Terminated Linear Poly(n-Butyl Acrylate)

A linear 350,000 Mn dibromo terminated poly(n-butyl acrylate) was synthesized according to the same method except no di(meth)acrylate branching agent was added. The mole ratio of monomer to initiator was 6500/1, the conversion of nBuA was 45% by $^1$H NMR analysis. The polymer solution was analyzed by GPC with RI and MALLs detector and the results are listed in table 1.

TABLE 1

|  |  | Mn |  | Mw |  | Mw/Mn |  |
|---|---|---|---|---|---|---|---|
|  |  | RI | LS | RI | LS | RI | LS |
| Comparative Example 1 |  | 352,200 | 393,000 | 549,800 | 509,200 | 1.56 | 1.30 |
| Inventive Example 1 | Before Branching | 22,300 |  | 34,400 |  | 1.54 |  |
|  | After Branching |  | 72,300 |  | 284,000 |  | 3.93 |
| Inventive Example 2 | Before Branching | 23,200 |  | 27,700 |  | 1.19 |  |
|  | After Branching |  | 24,000 |  | 46,500 |  | 1.94 |
| Inventive Example 3 | Before Branching | 22,100 |  | 26,700 |  | 1.21 |  |
|  | After Branching |  | 37,500 |  | 104,500 |  | 2.79 |
| Inventive Example 4 | Before Branching | 23,000 |  | 26,800 |  | 1.17 |  |
|  | After Branching |  | 21,500 |  | 67,400 |  | 3.13 |

Table 1 indicates the increase in number average (Mn) and weight average (Mw) after branching has occurred. The Molecular weight distribution (polydispersity index) is shown by Mw/Mn. As see from the table, the invention produces a significant increase in Mn and Mw, while maintaining a relatively narrow polydispersity.

Comparative Example 2: Synthesis of Diacrylate-Terminated Linear Poly(n-Butyl Acrylate)

A linear acrylate terminated telechelic poly(n-butyl acrylate) with Mn 30,000 was synthesized according to the method of US 2011/0060157 A1. The physical property data of the sample formulated with 22% IBOA and 1% photo initiator Irgacure 2022 is summarized in Table 2.

Example 5: Synthesis of Branched Polyacrylate by Copolymerization of n-BuA and HDDA The synthetic procedure of Example 1 was repeated using HDDA as difunctional branching agent. The mole ratio of HDDA to initiator was 7. The copolymerization was conducted for 2 hours following addition of HDDA.

The polymerization mixture was stripped under reduced pressure to remove ethanol and residual monomers. Then resin was re-dissolved in toluene. The polymer toluene mixture was filtered through a 0.5 mm filter pad to give a clear solution. The solvent was removed under reduced pressure to yield the copolymer.

The polymer sample was formulated with 22% IBOA and 1% photo initiator Irgacure 2022, then was cast as 2 mm film, irradiated with 70 mW/cm2 UV light using a medium pressure mercury vapor lamp for 30 sec. on each side. The hardness, tensile strength and elongation of the cured polymers were determined. The results are shown in Table 2

Example 6: Synthesis of Branched Polyacrylate by Copolymerization of n-BuA and Dodecanediol Diacrylate To a 3 L reaction jacked flask connected with a bath and fitted with mechanical stirrer, thermocouple, nitrogen sweep, condenser, 25 ml addition funnel and septum-sealed addition port was added diethyl 2,6-dibromoadipate (2.16 g; 6.0 mmoles), acetonitrile (253 g), n butyl acrylate (269 g, 2.1 mole), copper (II) bromide (0.013 g, 0.058 mmol), and copper mesh (1.4 g) cleaned by immersion in solution of HCl in acetone and rinsed with acetone before use. The mixture was purged with nitrogen for about 90 minutes, stirred and warmed to 45° C. To the 25 ml addition funnel was added dodecanediol diacrylate (6.87 g, 24.4 mmol), which was purged with nitrogen.

$Me_6$-TREN (0.14 g; 0.60 mmoles) in an air tight syringe was injected through the septum to start the polymerization. The polymerization continued for about 4.5 hrs with 85% nBuA conversion according to H-NMR.

Dodecanediol diacrylate in the addition funnel was added to the reactor. Another $Me_6$-TREN (0.14 g; 0.60 mmoles) in an air tight syringe was injected. The reaction was continued for an additional 0.5 hours at 45° C. and was quenched by etidronic acid aqueous solution.

The mixture was stripped under reduced pressure to remove $CH_3CN$ and residual monomers, then resin was re-dissolved in toluene. The polymer toluene mixture was filtered through a 0.5 mm filter pad to give a clear solution. The solvent was removed under reduced pressure to yield copolymer.

The polymer sample was formulated with 22% IBOA and 1% photo initiator Irgacure 2022, then was cast as 2 mm film, irradiated with 70 mW/cm2 UV light using a medium pressure mercury vapor lamp for 30 sec. on each side. The hardness, tensile strength and elongation of the cured polymers were determined. The results are shown in Table 2

Example 7: Synthesis of Branched Polyacrylate by Copolymerization of n-BuA and 3-(acryloyloxy)-2-hydroxypropyl methacrylate The synthetic procedure of Example 6 was repeated using 3-(acryloyloxy)-2-hydroxypropyl methacrylate as difunctional branching agent. The mole ratio of 3-(acryloyloxy)-2-hydroxypropyl methacrylate to initiator was 3. The copolymerization was conducted for 0.5 hour following addition of HDDA.

The polymer sample was formulated with 22% IBOA (isobornyl acrylate) and 1% photo initiator Irgacure 2022, then was cast as 75 mil film, irradiated with 70 mW/cm2 UV light using a medium pressure mercury vapor lamp for 30 sec. on each sides. The hardness, tensile strength and elongation of the cured polymers were determined. The results are shown in Table 2.

TABLE 2

Physical property Data

| Example | Tensile Strength psi | Elongation % | Hardness Shore A |
|---|---|---|---|
| Comparative Example 2 (linear acrylate terminated telechelic) | 451 | 407 | 26 |
| Example 5 (Inventive Branched) | 405 | 137 | 48 |
| Example 6 (Inventive Branched) | 424 | 285 | 35 |
| Example 7 (Inventive Branched) | 166 | 379 | 42 |

As indicated in Table 2, the branched polymers are capable of obtaining a range of physical properties.

What is claimed is:

1. A polymer composition comprising:
   (i) a linear or star-shaped block polyacrylate copolymer comprising the structure:

Ri-[{$A_a$}-{$B_bC_c$}—X]$_z$   (Structure III), wherein A is a polyacrylate block derived from a monofunctional (meth)acrylate monomer or monofunctional (meth)acrylamide monomer, BC is a random functionalized polyacrylate block, wherein portion B of the BC block contains a polymerizable group derived from a difunctional (meth)acrylate monomer or a difunctional (meth)acrylamide monomer and portion C of the BC block is derived from a monofunctional (meth)acrylate monomer or monofunctional (meth)acrylamide monomer; and

(ii) a linear or star-shaped block polyacrylate copolymer comprising the structure:

Ri-[{$A_a$}-{$B_{b-d}C_cD_d$}-X]$_z$   (Structure IV), wherein A is a polyacrylate block derived from a monofunctional (meth)acrylate monomer or monofunctional (meth)acrylamide monomer, and BCD is a random functionalized polyacrylate block, wherein portion B of the BCD block contains a polymerizable group derived from a difunctional (meth)acrylate monomer or a difunctional (meth)acrylamide monomer, portion C of the BCD block is derived from a difunctional (meth)acrylate monomer or a difunctional (meth)acrylamide monomer, and portion D of the BCD block includes a polymer branched-structure;

and wherein, in each of Structures III and IV the following definitions apply:
   Ri is an initiator fragment derived from halogenated compounds which initiate metal-catalyzed controlled radical polymerization;
   X is a halogen;
   z is an integer from 1-6;
   a is 10 to 10,000;
   b is an integer in the range from a/100 to a/10;
   c is an integer in the range from a/200 to a/2; and
   d is an integer greater than 0 and less than b.

2. The polymer composition of claim 1 where Structures III and IV have the following structures respectively:

wherein Ri is an initiator fragment derived from halogenated compounds which initiate metal-catalyzed controlled radical polymerization;
R is —$CH_3$ or H;
a is 10 to 10,000;
$R^1$ is a hydrocarbyl group $C_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;
G is a divalent hydrocarbyl group $O_{1-20}$ which may contain one or more heteroatoms and is selected from the group consisting of alkylenes, alkylene oxides, alkylene esters and combinations thereof and; X is a halogen;
Q is oxygen or $NR^2$, wherein $R^2$ is H or $C_{1-4}$ alkyl;
z is and integer from 1-6;
a is 10 to 10,000;
b is an integer in the range from a/100 to a/10;
c is an integer in the range from a/200 to a/2; and
d is an integer greater than 0 and less than b.

3. The polymer composition of claim 1 further including reactive end-groups in place of X, said reactive end-groups being selected from the group consisting of (meth)acrylates, alcohols, alkoxy groups, alkoxysilanes, alkenes, epoxides, acrylamides, photoinitiator groups and combinations thereof.

4. The polymer composition of claim 2 further including reactive end-groups in place of X, said reactive end-groups being selected from the group consisting of (meth)acrylates, alcohols, alkoxy groups, alkoxysilanes, alkenes, epoxides, acrylamides, photoinitiator groups and combinations thereof.

5. The polymer composition of claim 1, further comprising a cure system.

6. The polymer composition of claim 2, further comprising a cure system.

7. The polymer composition of claim 5, wherein the cure system is selected from the group consisting of anaerobic cure systems, heat cure systems, photocure systems, moisture cure systems and combinations thereof.

8. The polymer composition of claim 6, wherein the cure system is selected from the group consisting of anaerobic cure systems, heat cure systems, photocure systems, moisture cure systems and combinations thereof.

9. The polymer composition of claim 1 further comprising one or more components selected form the group consisting of a catalyst, a cure initiator, a reactive diluent, a viscosity modifier, a cure accelerator, an inhibitor, a thickener, a plasticizer, a coloring agent, a filler and combinations thereof.

10. The polymer composition of claim 2 further comprising one or more components selected form the group consisting of a catalyst, a cure initiator, a reactive diluent, a viscosity modifier, a cure accelerator, an inhibitor, a thickener, a plasticizer, a coloring agent, a filler and combinations thereof.

11. A controlled radical polymerization method for making polymerizable branched-functionalized polyacrylates comprising:
a) in a reaction vessel, reacting an initiator having the formula

$$Ri\text{—}[X]_z$$

with a monofunctional monomer having the structure to form a macro-initiator having a structure:

Structure I b) Sequentially reacting in the same reaction vessel the macro-initiator Structure I with a difunctional monomer having the structure:

Structure II wherein in each of the structures of this claim the following definitions apply;

Ri is an initiator fragment derived from halogenated compounds which initiate metal-catalyzed controlled radical polymerization;

R is —CH$_3$ or H;

a is from 10 to 10,000;

R$^1$ is a hydrocarbyl group C$_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;

G is a divalent hydrocarbyl group C$_{1-20}$ which may contain one or more heteroatoms and is selected from the group consisting of alkylenes, alkylene oxides, alkylene esters and combinations thereof and;

Q is O or NR$^2$, wherein R2 is H or C1-4 alkyl

X is a halogen;

z is and integer from 1-6; and wherein the sequentially reacting is conducted for a time and at a temperature to prevent complete conversion of the difunctional monomer.

12. The method of claim 11, further comprising adding monofunctional monomer along with the difunctional monomer in step b).

13. The method of claim 11, wherein the sequentially reacting is quenched prior to prevent complete conversion of the difunctional monomer.

14. The method of claim 11, wherein reaction products formed by the method are represented by the following structures:

Structure III

-continued

Structure IV wherein, in each of the structures of this claim the following definitions apply:

Ri is an initiator fragment derived from halogenated compounds which initiate metal-catalyzed controlled radical polymerization;

R is —CH$_3$ or H;

a is from 10 to 10,000;

R$^1$ is a hydrocarbyl group C$_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;

G is a divalent hydrocarbyl group C$_{1-20}$ which may contain one or more heteroatoms and is selected from the group consisting of alkylenes, alkylene oxides, alkylene esters and combinations thereof;

Q is O or NR$^2$ wherein R$^2$ is H or C$_{1-4}$ alkyl;

X is a halogen;

z is an integer from 1-6; and b is an integer in the range of from a/100 to a/10;

b is an integer in the range of from a/200 to a/2; and c is greater than 0 and less than a.

15. The method of claim 14, further including reacting the X moiety of Structures III and/or IV to give the corresponding polymers having chain-end groups selected from the group consisting of (meth)acrylates, alcohols, alkoxysilanes, alkoxy groups, alkylenes with and without ether, ester or alcohol groups, epoxides, acrylamides, photoinitiator groups and combinations thereof.

16. A polymerizable branched-functionalized polyacrylate composition comprising the controlled radical polymerization reaction products of:

(i) a macro-initiator having the structure:

Structure I wherein Ri is an initiator fragment derived from halogenated compounds which initiate metal-catalyzed controlled radical polymerization;

X is a halogen;

a is from 10 to 10,000;

z is 1-6; and (ii) a difunctional monomer having the structure:

Structure II wherein R in both structures I and II may be the same or different and may be —CH$_3$ or H; and R$^1$ is a hydrocarbyl group C$_{1-20}$ which may be interrupted by one or more heteroatoms and is substantially free of radically polymerizable groups, and which may contain one or more functional groups selected from the group consisting of hydroxyl, alkoxy, epoxy, ether, ester, amine, carbamate, amide and combinations thereof;

G is a divalent hydrocarbyl group $C_{1-20}$ which may contain one or more heteroatoms and is selected from the group consisting of alkylenes, alkylene oxides, alkylene esters and combinations thereof; and Q is O or $NR^2$, wherein $R^2$ is H or $C_{1-4}$ alkyl.

17. A controlled radical polymerization process for making flowable, branch-functionalized polyacrylates comprising:
    (i) forming a reaction mixture by feeding a mixture of one or more monofunctional (meth)acrylate monomers and at least one amine ligand at a defined flow-rate into a reaction vessel containing a solvent, and adding at least one halogenated initiator and a metal catalyst;
    (ii) sequentially feeding at least one difunctional (meth)acrylate monomer into the reaction mixture and allowing a reaction to proceed to obtain a desired degree of branch functionalized polyacrylate polymer to form, whereby the branch-functionalized polyacrylate is flowable.

18. The method of claim 11, wherein said monofunctional (meth)acrylate monomer is selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and combinations thereof.

19. The method of claim 11, wherein the initiator is selected from the group consisting of dimethyl 2,6-dibromoheptanedioate, diethyl meso-2,5-dibromoadipate, ethylene glycol bis(2-bromopropionate); 2,2-dichloacetophenone, trimethylolpropane tris(2-bromopropionate); methyl 2-bromopropionate, and combinations thereof.

20. The method of claim 11, further including a ligand selected from the group consisting of tris(2-dimethylaminoethyl)amine (Me6-TREN), N,N,N,N,N-pentamethyldiethylenetriamine (PMDETA), tris(2-aminoethyl)amine (TREN), and combinations thereof.

21. The method of claim 11, wherein the metal catalyst is selected from the group consisting of Cu(0), $Cu_2O$, $Cu_2S$, $Cu_2Se$, $Cu_2Te$, and combinations thereof.

22. The method of claim 11, further including the addition of a deactivator selected from the group consisting of $CuBr_2$, $CuCl_2$ and combinations thereof.

23. The method of claim 11, wherein the process is performed under SET-LRP conditions using a solvent selected from the group consisting of acetonitrile, dimethylformate, ethylene carbonate, methanol, ethanol, propanol, isopropanol, butanol, tert butanol, ethylene carbonate, propylene carbonate, dimethyl carbonate, water, dimethylformamide (DMF), dimethylsulfoxide (DMSO), dimethylacetamide (DMAc), propionitrile, ethylene glycol, diethylene glycol, triethylene glycol, 2-(2-ethoxyethoxy)ethanol, tetraethylene glycol, an ionic liquid, and combinations thereof.

24. The method of claim 17, wherein said monofunctional (meth)acrylate monomer is selected from the group consisting of methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, (meth)acrylic acid-ethylene oxide adducts, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate, 2-perfluorohexadecylethyl (meth)acrylate, and combinations thereof.

25. The method of claim 17, wherein the initiator is selected from the group consisting of dimethyl 2,6-dibromoheptanedioate, diethyl meso-2,5-dibromoadipate, ethylene glycol bis(2-bromopropionate); 2,2-dichloacetophenone, trimethylolpropane tris(2-bromopropionate); methyl 2-bromopropionate, and combinations thereof.

26. The method of claim 17, further including a ligand selected from the group consisting of tris(2-dimethylaminoethyl)amine (Me6-TREN), N,N,N,N,N-pentamethyldiethylenetriamine (PMDETA), tris(2-aminoethyl)amine (TREN), and combinations thereof.

27. The method of claim 17, wherein the metal catalyst is selected from the group consisting of Cu(0), $Cu_2O$, $Cu_2S$, $Cu_2Se$, $Cu_2Te$, and combinations thereof.

28. The method of claim 17, further including the addition of a deactivator selected from the group consisting of $CuBr_2$, $CuCl_2$ and combinations thereof.

29. The method of claim 18, wherein the process is performed under SET-LRP conditions using a solvent selected from the group consisting of acetonitrile, dimethylformate, ethylene carbonate, methanol, ethanol, propanol, isopropanol, butanol, tert butanol, ethylene carbonate, propylene carbonate, dimethyl carbonate, water, dimethylformamide (DMF), dimethylsulfoxide (DMSO), dimethylacetamide (DMAc), propionitrile, ethylene glycol, diethylene glycol, triethylene glycol, 2-(2-ethoxyethoxy)ethanol, tetraethylene glycol, an ionic liquid, and combinations thereof.

30. An article of manufacture comprising the reaction product of claim 17.

31. An adhesive, sealant, or coating composition comprising the composition of claim 1.

32. An adhesive, sealant, or coating composition comprising the composition of claim 2.

* * * * *